Dec. 29, 1959   D. H. PRUETT   2,918,689
COMBINATION WINDSHIELD WASHER AND WIPER BLADE
Filed Dec. 13, 1957
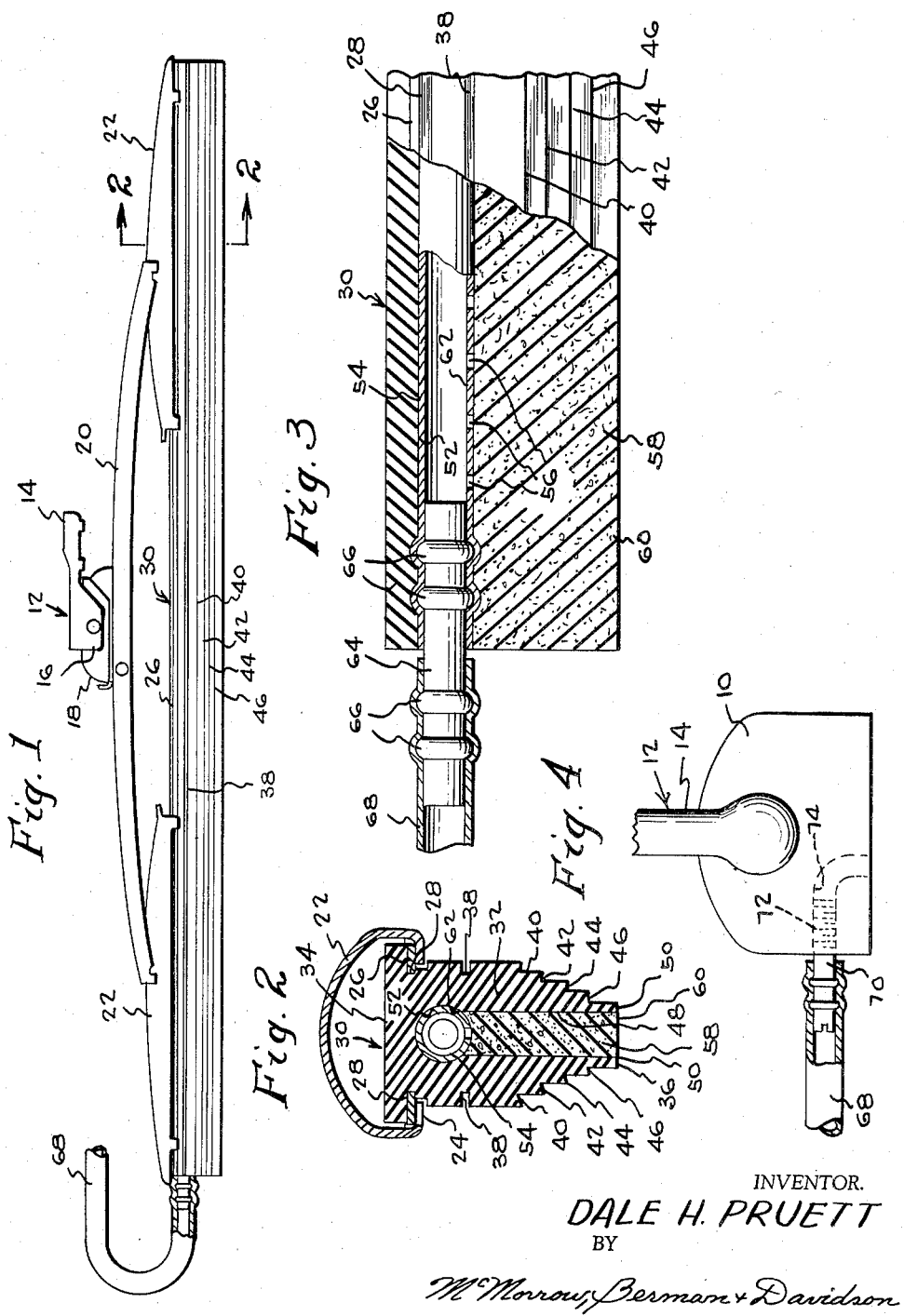
INVENTOR.
DALE H. PRUETT
BY
McMorrow, Berman & Davidson
ATTORNEYS

United States Patent Office 2,918,689
Patented Dec. 29, 1959

2,918,689

COMBINATION WINDSHIELD WASHER AND WIPER BLADE

Dale H. Pruett, Medford, Oreg.

Application December 13, 1957, Serial No. 702,679

1 Claim. (Cl. 15—250.4)

This invention relates generally to windshield wiper construction, and more particularly has reference to a windshield wiper blade which has the characteristics and functions both of a windshield wiper blade and of a windshield washer.

Windshield wiper blades operate with optimum efficiency when there is a predetermined quantity of water on the area traversed by the windshield wiper blade. If the water falls below said predetermined amount, there is not sufficient liquid to wash away the dirt, and the blade merely traverses a dirty area and, in fact, spreads the dirt. This is often the case, for example, when the road surface is wet, but when rain is not actually falling. In such instances, traffic will throw substantial amounts of dirt onto a windshield, which cannot be wiped off. Many vehicles, of course, are equipped with windshield washers, but some of these have the disadvantage that they do not spread the water over a sufficient area to be traversed by a windshield wiper blade. Others have a disadvantage in that they do not confine the spray of water to the area in which it will do the most good, so that the liquid is wasted.

One object of importance, accordingly, is to build into a windshield wiper blade a water applicator, to which water will be forced by a suitable pump, said applicator being designed to distribute water over the exact area traversed by the windshield wiper blade, thereby to eliminate waste of the liquid, which is desirable so as to reduce the necessity of refilling the reservoir of said liquid. This is particularly important not only because of the inconvenience of refilling the reservoir, but also because the liquid of the reservoir often has to be specially prepared, to include anti-freeze solutions, etc.

Still another object is to provide, in a windshield washer blade of the type stated, means facilitating interchange of the blades, with minimum difficulty.

A further object of importance is to provide, in a combined windshield washer and wiper blade, an arrangement in which the wiping functions will be carried out with the same efficiency as a blade not having the applicator means referred to above, this being desirable in the event there is sufficient water on the windshield so that one need not force water from the reservoir to the windshield washing assembly.

Another object is to provide, in a windshield wiper blade of the character stated, a relatively soft, absorbent, sponge-like member, which will cooperate with harder portions at opposite sides thereof in providing a cleaning action of maximum efficiency, even when water is not being forced through the liquid-absorbent element.

A further object is to force the liquid to the windshield wiper blade through a conduit connectable to a fitting carried by the blade mount.

Still another object of importance is to provide a windshield wiper blade of the type stated which can be attached to the conventional blade support assembly without requiring any modification or redesign whatever of said assembly.

Other objects will appear from the following description, the claim appended thereto, and from the annexed drawing, in which like reference characters designate like parts throughout the several views, and wherein:

Figure 1 is a side elevational view of a blade formed according to the present invention, a portion of the supply tube being shown in longitudinal section;

Figure 2 is a greatly enlarged transverse sectional view substantially on line 2—2 of Figure 1;

Figure 3 is a fragmentary view partly in longitudinal section and partly in side elevation, through the inner end portion of the wiper blade, on the same scale as Figure 2; and Figure 4 is a fragmentary view partly in elevation and partly in section of the blade mount.

Referring to the drawing in detail, designated at 10 is a blade mounting bracket. This is basically of conventional design, and as will be understood, said bracket or mount is secured to the cowl at the base of the windshield, in position to support for pivotal movement a windshield wiper blade assembly generally designated 12. The blade assembly 12 includes the usual pivoted blade support arm 14, and said arm would be provided, at its outer end (see Figure 1) with a yoke 16, embracing a connector bracket 18 mounted upon the midlength portion of a longitudinally outwardly bowed, elongated blade support member 20 to the opposite ends of which are pivotally connected elongated blade support clips 22. This is wholly conventional construction, and as shown in Figure 2, the clips 22 are conventionally bowed transversely, outwardly from the windshield wiper blade. Integrally formed upon the opposite side edge portions of the clips 22 are inwardly directed flanges or lips 24, and these engage under the opposite side edges of an elongated blade support bar 26 which is engaged in the outwardly facing, longitudinal grooves 28 of the windshield wiper blade 30 constituting the present invention.

The windshield wiper blade 30 comprises an elongated body 32 and this may be formed intermediate its back surface 24 and its windshield-contacting or wiping surface 36, with longitudinal grooves 38. Below the grooves 38, the body 32 at opposite sides thereof is formed with a series of steps or longitudinally extending shoulders 40, 42, 44, 46, which progressively reduce the body in thickness in a direction toward its windshield-contacting surface. This includes the transverse flexibility of the body, adjacent the surface 36, and this arrangement, of course, is per se conventional.

In accordance with the invention, the body 32, which of course would be formed of a soft rubber or its equivalent, has a longitudinally and centrally disposed, deep recess 48. Recess 48 opens, for its full length, upon the windshield-contacting surface 36, said recess taking up almost the full area of the surface 36 in a direction transversely of said surface. Further, the recess 48 extends the full length of the windshield wiper body. As a result, the body 32 has only narrow surfaces 50, disposed at opposite sides of the recess 48.

In depth, the recess 48 extends substantially the major part of the depth of the blade, terminating, however, in a longitudinal bore 52 of circular cross section, extending fully from end to end of the body. Bore 52 snugly receives a tube or conduit 54, which would be of a flexible plastic material, or other material having at least as great a characteristic of flexibility as the material of the body itself, whereby said tube will not inhibit the flexure of the body as the body conforms to the shape of the windshield during its traverse of the windshield area over which the blade wipes.

In any event, tube 54 is formed, at closely, uniformly spaced intervals over its full length, with small perforations 56, said perforations opening into the recess 48.

Filling the recess 48 is a liquid-absorbent, flexible liquid applicator portion 58. Portion 58 has an outer surface 60 flush with the wiping surfaces 50 of body 32. The inner surface 62 of applicator portion 58 is in direct contact with the apertured side of the tube 54.

By reason of this arrangement, when water is forced into the tube 54 through a connector fitting 64 engaged in one end of the tube, said water or other liquid will be forced through the apertures 56. It will be understood that the tube 54, at the end thereof remote from the fitting 64, will be permanently closed.

The connector fitting 64 has a plurality of circumferentially extending ribs 66, designed to frictionally bind the connector tube in the adjacent end of the tube 54. The connector tube, at its outer end, has a similar connection to a flexible, thin-walled conduit or supply tube 68, which as shown in Figure 4 is connected to a tubular connector fitting 70 engaged threadedly as at 72 in an L-shaped conduit 74 of bracket 10. Conduit 74, at its inlet end, would be connectable to a source of water under pressure, as for example, a pump, not shown, that pumps water from a liquid reservoir, also not shown.

By reason of this arrangement, and assuming that a suitable valve is provided under the control of the vehicle operator, the water can be turned on or off at will, independently of the oscillating movement of the windshield wiper blade. Therefore, if it is desired to cause water to be forced out of the applicator portion 58 simultaneously with traverse of the windshield by the wiper blade, one turns to open position the necessary valve, which of course could be solenoid-controlled or otherwise electrically operated, so as to be operable by a push button switch on the dashboard of the vehicle. In any event, liquid is forced through conduit 74, and through tube 68, into the tube 54. Thereafter, the liquid is forced through the apertures 56 and thence through the applicator portion 58, to flow through the surface 60 onto the windshield. In this way, there is a continuous supply of water directed to the windshield between the wiping surfaces 50 of the wiper body. There is no unnecessary spreading of water, accordingly, since the water is immediately wiped off without flowing freely to areas other than the area covered by the wiping surface of the blade itself. This is desirable, since freely flowing water on the windshield tends to impede vision as well as to react detrimentally to the full operating efficiency of the windshield wiper blade.

As hereinbefore brought out, the construction illustrated and described is intended for application to windshields having a curved formation, as a result of which the body 32, tube 54, and applicator portion 58 are all of longitudinally flexible characteristics. Therefore (as the windshield wiper moves back and forth across the surface of the windshield, over a curved area of the windshield, there is a relatively continuous flexure of the entire device, as the liquid is being fed through the applicator portion.

This flexure may be slight, and of course, would depend upon the extent of curvature of the area of the windshield traversed by the windshield wiper, and the extent to which said curvature changes between the opposite extremes of the movement of the windshield wiper blade. Nevertheless, the flexure does occur, this being, of course, the reason for the provision of longitudinally flexible windshield wiper blades on windshields of modern design.

As the flexure occurs, the flexing of the applicator portion will tend to disperse the liquid more uniformly, and promote the free discharge thereof onto the surface of the windshield, than would be true if the windshield blade were retained perfectly straight during its traverse of the windshield. This is an inherent characteristic in the construction, as will be apparent when one considers the action of a sponge-like body that is maintained in an undeformed condition, in comparison to another sponge-like body that is being continuously flexed or deformed. Assuming that in both cases liquid is being fed in substantially the same manner to the sponge-like bodies, said body which is being flexed or deformed substantially continuously will tend to discharge liquid more freely, and will further tend to facilitate the dispersal of the liquid therethrough. In the arrangement illustrated, this characteristic is provided, producing a particularly effective coaction between the tube, relatively non-absorbent but flexible body, and the absorbent applicator portion, all formed and relatively arranged in the manner hereinbefore described.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A windshield wiper blade comprising: an elongated normally straight body flexible over its full length both longitudinally and transversely and formed wholly of a liquid-impervious resilient material, said body including a flat front surface constituting the narrowest part thereof, the body having a longitudinally and centrally extending recess constant in width over its full length and depth and opening at its front upon said surface to define on opposite sides of the recess coplanar, windshield-contacting, wiping surfaces, said body having a longitudinal bore in communication with the bottom of the recess and having a back surface disposed in close proximity to the bore, the body progressing in width in a direction from the front to the back surfaces whereby to define walls at opposite sides of the recess that are of progressively increasing width in said direction, each wiping surface forming an edge of one of said walls, each wall reaching its maximum width intermediate the open front of the recess and the bottom thereof and thereafter remaining substantially constant in width in the sense of said direction to and beyond the bottom of the recess and said bore; a longitudinally flexible tube engaged in said bore and having a longitudinal series of perforations opening into the recess; and a liquid-absorptive, longitudinally and transversely flexible applicator portion filling the recess over the entire length, breadth, and depth thereof, said applicator portion having an inner surface in direct contact with the tube over the full length of the applicator portion and a flat outer surface coplanar with said wiping surfaces.

References Cited in the file of this patent

UNITED STATES PATENTS

| | | |
|---|---|---|
| 1,868,783 | Williams | July 26, 1932 |
| 1,874,758 | Ketchhedge | Aug. 30, 1932 |
| 1,920,730 | Wiseman | Aug. 1, 1933 |
| 1,933,122 | Sanborn | Oct. 31, 1933 |
| 2,582,717 | Pierce | Jan. 15, 1952 |
| 2,782,445 | Krohm | Feb. 26, 1957 |

FOREIGN PATENTS

| | | |
|---|---|---|
| 466,827 | Canada | July 25, 1950 |